United States Patent
Kumpula et al.

(10) Patent No.: US 8,155,079 B2
(45) Date of Patent: Apr. 10, 2012

(54) METHOD, MEASURING SYSTEM, BASE STATION, NETWORK ELEMENT, AND MEASURING DEVICE

(75) Inventors: Juha Kumpula, Oulu (FI); Hannu Toppinen, Kempele (FI); Jorma Ikäheimo, Oulu (FI)

(73) Assignee: Nethawk Oyj, Oulu (FI)

( * ) Notice: Subject to any disclaimer, the term of this patent is extended or adjusted under 35 U.S.C. 154(b) by 113 days.

(21) Appl. No.: 12/048,573

(22) Filed: Mar. 14, 2008

(65) Prior Publication Data

US 2009/0232013 A1    Sep. 17, 2009

(30) Foreign Application Priority Data

May 22, 2007 (EP) ..................... 07108624

(51) Int. Cl.
*H04W 4/00* (2009.01)
(52) U.S. Cl. ...................................... 370/331
(58) Field of Classification Search .......... 370/328, 370/329, 331–334, 338; 455/436, 438, 439, 455/440–445

See application file for complete search history.

(56) References Cited

U.S. PATENT DOCUMENTS

| | | | | |
|---|---|---|---|---|
| 5,982,759 A * | 11/1999 | Jo et al. | | 370/331 |
| 6,014,564 A * | 1/2000 | Donis et al. | | 455/436 |
| 6,070,075 A * | 5/2000 | Kim | | 455/437 |
| 6,188,906 B1 * | 2/2001 | Lim et al. | | 455/453 |
| 6,400,952 B2 * | 6/2002 | Kim et al. | | 455/436 |
| 7,096,000 B2 * | 8/2006 | Yano | | 455/345 |
| 7,603,141 B2 * | 10/2009 | Dravida | | 455/562.1 |
| 7,729,693 B2 * | 6/2010 | Delaveau et al. | | 455/424 |
| 2004/0127223 A1 * | 7/2004 | Li et al. | | 455/446 |
| 2008/0020749 A1 * | 1/2008 | Delaveau et al. | | 455/423 |
| 2008/0219212 A1 * | 9/2008 | Kim | | 370/331 |

FOREIGN PATENT DOCUMENTS

| | | |
|---|---|---|
| EP | 1 051 053 A2 | 11/2000 |
| WO | WO 2005/112497 A1 | 11/2005 |
| WO | WO 2006/048508 (A1) | 5/2006 |
| WO | WO 2007/010225 A1 | 1/2007 |

OTHER PUBLICATIONS

Search Report issued in corresponding EP Patent Application No. 07 10 8624, by the European Patent Office, Oct. 29, 2007; The Hague, The Netherlands.

* cited by examiner

*Primary Examiner* — Kwang B Yao
*Assistant Examiner* — Juvena Loo
(74) *Attorney, Agent, or Firm* — Buchanan Ingersoll & Rooney PC (57) ABSTRACT

There is provided a measuring system comprising: a measuring device configured to measure parameters of a serving cell required for camping into the neighbor cells of the serving cell, to camp into the neighbor cells in order to store reception quality and neighbor cell lists from the neighbor cells; and a base station configured to set parameters of the formed virtual cell such that the virtual cell becomes a tempting destination for a cell reselection, to interfere the serving cell in order to cause the one or more user terminals to camp into the virtual cell, and to catch one or more identifiers of the one or more user terminals camping into the virtual cell after the start of virtual cell transmission.

17 Claims, 3 Drawing Sheets

METHOD, MEASURING SYSTEM, BASE STATION, NETWORK ELEMENT, AND MEASURING DEVICE

FIELD

The invention relates to a method, to a measuring system, to a base station for a measuring system, to a network element for a measuring system, to a measuring device, and to a computer-readable program distribution medium.

BACKGROUND

Finding out identities of user terminals, such as mobile phones, of different users has become increasingly difficult. Conventionally, personal user information is given when the users are registered as telephone subscribers, and the identifications of subscriptions and user equipment of a specific user can easily be established by using the information received in the registration process. However, lately so-called prepaid accounts enabling registering as subscribers without submitting any personal user information have become increasingly common. The prepaid accounts are also often used for criminal purposes when there is a motivation to hide the used equipment and accounts in such a way that for example legal monitoring or tracing of calls by a public authority becomes impossible.

Mobile phone can also easily fall into wrong hands due to theft or careless mistakes. Further, illegal copying of SIM (subscriber identity module) cards of mobile phones has become common. This enables unauthorized use of the same equipment identifiers that are used by a user terminal of the actual, legal user, and at the expense of the legal user.

Because of the foregoing reasons, problems more increasingly occur in finding out the identifiers of user equipment used by suspicious persons, for example, when starting of legal monitoring or supervision by a public authority is needed. A police authority may, for example, know personal information with an address of a suspicious person; however, finding out the identifiers of the mobile phones used by this person may not anymore be possible.

Further, reliable positioning systems are needed particularly in emergency situations, when operating in difficult circumstances and in different rescue operations, for example to locate missing persons through their mobile stations. Positioning should also be possible for example in a situation where the user of a mobile station is not personally capable of using the device. It is also possible that a person in distress succeeds in making an emergency call but does not know his/her location, or the call is disconnected before the person is able to tell the location. A reliable positioning system is also needed when a person on a hiking tour, for example, is unable to call for help because he/she is in an area that is not covered by the public radio network.

In some radio systems, entering of user terminals and the identifications thereof to an unauthorized network, not being a part of the network of a public operator, has been inhibited. For example, in 3G (3rd generation mobile communications) systems, there is a procedure called an Integrity Protection that enables the user terminals to verify that they are connected to the actual 3G network. This is done by appending a message authentication code calculated over the sent messages and checking the authentication code at the receiving end. Message authentication code is calculated by using a secret key of a user terminal that is only known by the user terminal itself and by an authorized network.

Integrity protection is used to protect sensitive messages exchanged between user terminals and the radio network controller, preventing user terminals from continuing communication for e.g. up to the call setup phase. In the case integrity protection is not turned on by the network after radio resource control connection setup, the user terminal will release the connection. This makes radio direction finding using a method described in a patent application WO2006/048508 of the applicant unfeasible without the access to the user terminals' secret keys. WO2006/048508 describes a method for positioning a mobile station. However, the method described in this application cannot be used e.g. when these secret keys of user terminals are not available because of the integrity protection measures by a 3G network, for example.

BRIEF DESCRIPTION OF THE INVENTION

An object of the invention is to provide an improved method, a measuring system, a base station for a measuring system, a network element for a measuring system, a measuring device, and a computer-readable program distribution medium.

According to an aspect of the invention, there is provided a method comprising: emulating the functions of a public land mobile network to a base station of a measuring system by a network element of the measuring system; and forming at least one virtual cell by means of the measuring system. The method further comprises: measuring parameters of a serving cell of the public land mobile network required for camping into the neighbor cells of the serving cell; camping into the neighbor cells in order to store reception quality and neighbor cell lists from the neighbor cells by using the measured parameters; setting parameters of the formed virtual cell such that the virtual cell becomes a tempting destination for a cell reselection; interfering the serving cell in order to cause the one or more user terminals to camp into the virtual cell; and catching one or more identifiers of the one or more user terminals camping into the virtual cell after the start of virtual cell transmission.

According to another aspect of the invention, there is provided a measuring system comprising: at least one processing unit controlling the operations of the system; at least one base station configured to form at least one virtual cell; and a network element configured to emulate the functions of a public land mobile network to the base station. The measuring system further comprises a measuring device configured to measure parameters of a serving cell of the public land mobile network required for camping into the neighbor cells of the serving cell, to camp into the neighbor cells in order to store reception quality and neighbor cell lists from the neighbor cells by using the measured parameters; and the base station is further configured to set parameters of the formed virtual cell such that the virtual cell becomes a tempting destination for a cell reselection, to interfere the serving cell in order to cause the one or more user terminals to camp into the virtual cell, and to catch one or more identifiers of the one or more user terminals camping into the virtual cell after the start of virtual cell transmission.

According to another aspect of the invention, there is provided a base station for a measuring system, the base station being configured to form at least one virtual cell. The base station is further configured: to set parameters of the formed virtual cell such that the virtual cell becomes a tempting destination for a cell reselection, to interfere the serving cell in order to cause the one or more user terminals to camp into the virtual cell, and to catch one or more identifiers of the one or more user terminals camping into the virtual cell after the start of virtual cell transmission.

According to another aspect of the invention, there is provided a network element for a measuring system, the network element being configured to emulate the functions of a public land mobile network to a base station of the measuring system, and to control the base station to form at least one virtual cell. The network element is further configured to control the base station to set parameters of the formed virtual cell such that the virtual cell becomes a tempting destination for a cell reselection, to interfere the serving cell in order to cause the one or more user terminals to camp into the virtual cell, and to catch one or more identifiers of the one or more user terminals camping into the virtual cell after the start of virtual cell transmission.

According to another aspect of the invention, there is provided a measuring device for a measuring system. The measuring device is configured to measure parameters of a serving cell of the public land mobile network required for camping into the neighbor cells of the serving cell, and to camp into the neighbor cells in order to store reception quality and neighbor cell lists from the neighbor cells by using the measured parameters in order to enable the base station of the measuring system to set parameters of a formed virtual cell such that the virtual cell becomes a tempting destination for a cell reselection, to interfere the serving cell in order to cause the one or more user terminals to camp into the virtual cell, and to catch one or more identifiers of the one or more user terminals camping into the virtual cell after the start of virtual cell transmission.

According to another aspect of the invention, there is provided a computer-readable program distribution medium encoding a computer program of instructions for executing a computer process comprising: emulating the functions of a public land mobile network to a base station of a measuring system by a network element of the measuring system; forming at least one virtual cell by means of the measuring system; measuring parameters of a serving cell of the public land mobile network required for camping into the neighbor cells of the serving cell; camping into the neighbor cells in order to store reception quality and neighbor cell lists from the neighbor cells by using the measured parameters; setting parameters of the formed virtual cell such that the virtual cell becomes a tempting destination for a cell reselection; interfering the serving cell in order to cause the one or more user terminals to camp into the virtual cell; and catching one or more identifiers of the one or more user terminals camping into the virtual cell after the start of virtual cell transmission.

The invention provides several advantages. User terminal identification problems are overcome. Catching of user terminal identifiers becomes possible even in radio systems where Integrity Protection measures are used. According to an embodiment, a method for radio direction finding is enabled without the need for expensive equipment and hard-to-make connections to authentication centers.

LIST OF DRAWINGS

In the following, the invention will be described in greater detail with reference to the embodiments and the accompanying drawings, in which.

and

DESCRIPTION OF EMBODIMENTS

Figure 1:
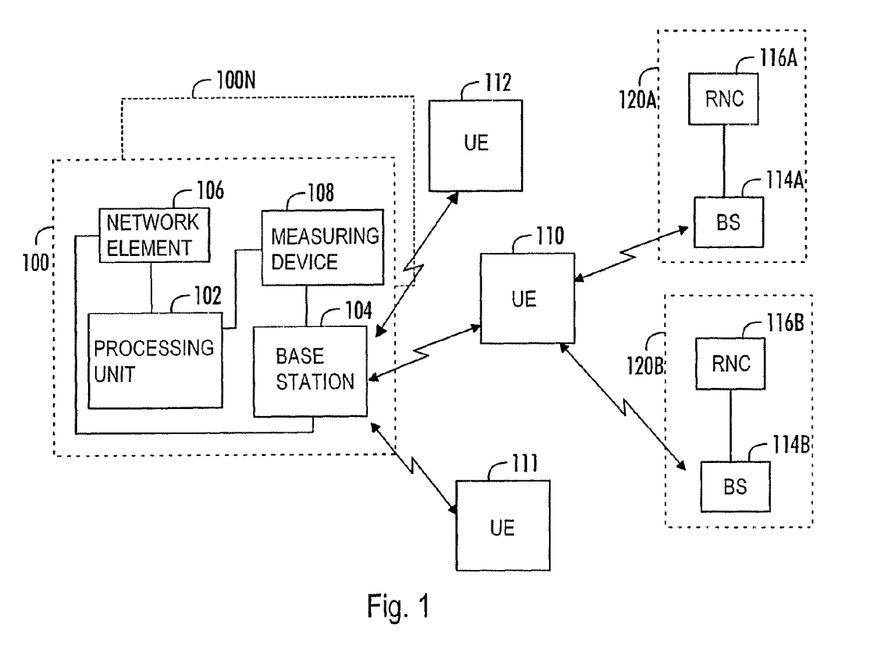
FIG. 1 shows an example of a radio system.

FIG. 1 illustrates an example of a data transmission system in which the disclosed solution can be applied. FIG. 1 shows user terminals 110-112, which may be for example mobile phones provided with the usual functionalities, PDA (personal digital assistant) devices provided with communications connections, or some other similar devices capable of communicating with a data transmission network, for example. The user terminals 110-112 communicate for example within a data transmission network represented in FIG. 1 by radio access networks 120A, 120B. The data transmission network may be based on GSM (Global System for Mobile Communications), WCDMA (Wideband Code Division Multiple Access), CDMA (Code Division Multiple Access) technology, or WIMAX (Worldwide Interoperability for Microwave Access), for example. The invention is, however, not limited to these exemplary radio systems but can be implemented to any radio systems having elements required for implementing the invention as claimed.

The radio access network RAN 120A, 120B comprises at least one radio network controller RNC 116A, 116B. The radio network controller 116A, 116B controls at least one base station 114A, 114B. The radio network controller 116A, 116B may also be referred to as a base station controller, and the base station 114A, 114B as a node B. When within the coverage area of the data transmission network, the mobile station 110 may communicate with one or more base stations 114A, 114B over GSM/GPRS/EDGE connections, for example.

A measuring system 100 of FIG. 1 comprises a processing unit 102 controlling the operations of the measuring system, at least one base station 104 connected to the processing unit 102, and a network element 106 controlling the operations of the base station. The base station 104 is connected to the processing unit 102 via the network element 106. The positioning system 100 may also comprise a user interface enabling the operations of the system 100 to be controlled and monitored. In addition, the user interface may comprise a display and a keyboard. The user interface may further comprise various user interface parts, such as a microphone and a loudspeaker. The system may also comprise a satellite locator for determining the location of the measuring system. The measuring system 100 may also comprise a memory as well as various other elements. When necessary, all parts of the measuring system 100 may be integrated into a single device. The measuring system 100 may also comprise other portable elements comprising at least the processing unit 102, base station 104 and network element 106, which are illustrated in FIG. 1 by reference 100N.

The network element 106 of the measuring system 100 operates by emulating the operations of the public land mobile telephone network to the base station 104 over a radio network controller interface. The network element may comprise a NetHawk™ RNC/Iub Simulator tool, for example, which in turn may also comprise protocol elements above the radio network controller, such as an MSC (Mobile Services Switching Center), HLR (Home Location Register), GGSN (Gateway GPRS Support Node), SGSN (Serving GPRS Support Node), to enable communication at the Iub interface without a connection to the actual mobile network.

The network element 106 may be connected to one or more base stations 104. The network element 106 also enables mobile phones, for example, to be linked to the measuring system 100, thus allowing the mobile phones to communicate through the base station 104.

The processing unit 102 is a block controlling the operation of the devices and today it is usually implemented as a processor provided with the associated software, although different hardware configurations are also possible, such as circuits consisting of separate logic components or one or more Application-Specific Integrated Circuits (ASIC). Also a hybrid of these implementations is possible. The measuring system 100 may comprise a personal computer carrying for example a Windows® or some other user interface and equipped with a network element 106 linking the system to the base station 104. The network element 106 comprises an interface card, for example, that can be implemented into an extension card conforming to the PCCard standard, for example. The interface card is used for connecting data traffic to the system 100 over an E1 (European Digital Signal 1) link providing the base station with a radio network controller interface. The base station may provide the radio network controller interface also via an IP network, in which case it may connect to the network element through the IP interface of a personal computer.

The processing unit 102 in the measuring system 100 is responsible for data processing. According to an embodiment, the measuring system 100 further comprises at least one measuring device 108, such as a mobile terminal, that is configured to communicate with the public land mobile network. The measuring device 108 can be a separate device that is configured to establish a wired or wireless connection with the processing unit 102. The measuring device 108 may communicate through the base station 104, for example.

In an embodiment, the measuring device 108 is configured to measure parameters of a serving cell of the public land mobile network required for camping into the neighbor cells of the serving cell, and to camp into the neighbor cells in order to store reception quality and a neighbor cell list from the neighbor cells by using the measured parameters.

The base station 104 of the measuring system is configured to form a virtual radio cell, and to set parameters of the formed virtual cell for masquerading a neighbor cell such that the virtual cell becomes a tempting destination for a cell reselection.

The base station 104 is further configured to interfere the serving cell by at least one of: starting the transmission of the virtual cell, forming a second virtual cell masquerading the serving cell, transmitting noise in the transmission frequency and jamming downlink frequencies of other base stations in order to cause the one or more user terminals 110-112 to camp into the virtual cell, and to catch one or more identifiers of the one or more user terminals 110-112 camping into the virtual cell after the start of virtual cell transmission.

Examples of the catched identifiers include IMSI (International Mobile Subscriber Identity) and IMEI (International Mobile Station Equipment Identity) of the mobile station 110-112 and MAC (Media Access Control) address of the mobile station 110-112. IMSI is a unique subscriber identifier containing an NMSI (National Mobile Subscriber Identity) and an MCC (Mobile Country Code). IMEI and MAC addresses in turn are identifiers that enable the mobile station to be uniquely identified as a part of a specific device or system.

An embodiment of the invention enables communicating with mobile phones 110-112 in the area of the virtual cell formed by the measuring system 100 and catching the identifiers used by these mobile phones.

In a 3G-radio system environment for example, the measuring device 108 may be configured to measure at least the parameters of frequency, scrambling codes, and neighbor cells of a serving cell of the public land mobile network. However, for example in a WiMAX radio system environment, the measuring device 108 may be configured to measure NAPs (Network Access Providers) and NSPs (Network service providers) available through NAPs. The base station 104 may be configured to broadcast the selected NAP and NSPs. A user terminal may then detect available NAPs by scanning and decoding DL-MAP (downlink map) messages on detected channel(s). An RNG-REQ (ranging request) message may be transmitted by the user terminals at initialization and periodically for determining a network delay and for requesting power and/or downlink burst profile change. A Mobile station MAC address is included in the RNG-REQ message and thus, the user terminal can be identified without the need to perform authentication.

In an embodiment, the measuring device 108 is configured to store reception quality values, such as Ec/No (ratio of energy per modulating bit to the noise spectral density) or RSCP (received signal code power) when camping into the neighbor cells. The stored reception quality values may depend on cell selection criteria that are set by the serving cell.

In an embodiment, the collected neighbor cells reception quality is evaluated and a neighbor cell with the best coverage in the neighbor cell lists and the lowest quality is selected to be masqueraded.

The base station 104 is configured to interfere the serving cell by at least one of: starting the transmission of the virtual cell; forming a second virtual cell masquerading the serving cell; transmitting noise in the transmission frequency, and jamming downlink frequencies of other base stations.

In an embodiment, enough interference can be caused to the serving cell merely by starting a transmission in the virtual cell. This can be checked with the measuring device 108. In the case the virtual cell transmission does not cause enough interference to the serving cell, the base station 104 can be configured to form a second virtual cell masquerading to be the original serving cell and, thus interfering the transmission of the serving cell. In another embodiment, it is possible to cause interference by transmitting noise at the transmission frequency of the serving cell, thus causing the level of noise increasing. For example, in a WiMAX environment, it is possible to jam downlink frequencies of other base stations in order to get all user terminals in the coverage area of the virtual base station to perform network entry into the virtual base station 104. This way the user terminals may have difficulties finding a serving cell among the other base stations, and are inclined to make connection to the virtual base station 104.

The base station 104 is configured to set the virtual cell parameters to be such that the virtual cell masquerades the selected neighbor cell, and in order to set the parameters related to cell reselection so that the formed virtual cell becomes the most tempting destination for cell reselection. In an embodiment, a LAC (location area code) code of the virtual cell is set to be different than in the serving cell and neighbor cells in order to make the mobile terminals 110-112 in the virtual cell area make location updates or cell updates into the virtual cell.

In an embodiment, transmission of the formed virtual cell is started and the mobile terminals 110-112 in the virtual cell start making cell reselections into the virtual cell. In an embodiment, when a mobile terminal 110-112 makes a cell reselection to a cell having a different LAC code than that of the serving cell, a location update procedure or a cell update procedure is started. During the location update/cell update, the base station 104 is configured to query identifiers, such as IMSI and IMEI, of the mobile terminals 110-112.

In an embodiment, the base station 104 is configured to close a connection to the one or more mobile terminals 110-112 with a cause code after catching the one or more identifiers of the mobile terminals 110-112 for preventing the mobile terminals 110-112 from camping into the virtual cell and for enabling the them to reselect another cell from the public land mobile network.

In some radio systems, the serving cell may limit the user terminals 110-112 that it serves to perform intra-frequency measurements. The measurements can be limited e.g. by means of the serving cell by broadcasting $S_{intrasearch}$ or HCS (Hierarchical Cell Selection) in system information. $S_{intrasearch}$ is a limit value for making intra-frequency measurements. In the case $S_{intrasearch}$ is not sent for the serving cell, the user terminals 110-112 may perform intra-frequency measurements, and thus, can find the formed virtual cell. In the case $S_{intrasearch}$ is sent for the serving cell and HCS is not used, the user terminals 110-112 will use Squal for a decision of starting the intra-frequency measurements. Squal is a Cell Selection quality value (dB), and it can be defined by subtracting a Qqualmin value, i.e. minimum required quality level in the cell (read in system information)(dB), from a Qqualmeas value, i.e. a measured cell quality value (i.e. quality of the received signal expressed in CPICH (common pilot channel) Ec/No (dB)). In the case the Squal is larger than the $S_{intrasearch}$, the user terminals 110-112 are not required to perform intra-frequency measurements. In order to make the user terminals 110-112 to perform the cell reselection, the intra-frequency measurements should be active to find the formed virtual cell by the user terminals 110-112.

Starting the virtual cell transmission causes the Squal value to decrease because it is the nature of e.g. a WCDMA system to raise background noise when transmissions in the same frequency are started. In an embodiment, to be sure the Squal value drops enough for making the user terminals to perform measurements, a second virtual cell can be formed that starts masquerading the original serving cell. Before using the second virtual cell, the Squal value of the original cell can be checked by using the measuring device 108, and the transmission from the second virtual cell can be started only if the Squal value exceeds or is near the $S_{intrasearch}$ limit. The Squal value of the serving cell can be decreased as well by generating noise to the used frequency.

In an embodiment, if HCS is used and $S_{intrasearch}$ is not sent for the serving cell, the user terminals may measure on all intra-frequency cells. In an embodiment, if HCS is used and $S_{intrasearch}$ is sent, the user terminals may measure on all intra-frequency cells having an HCS priority level equal to or higher than that of the serving cell.

In an embodiment, if the HCS is used in the radio network, such a cell is selected to be masqueraded by the virtual cell that is heard in most of the neighboring cells and has the best HCS priority level/quality of the received signal ratio. This selection ensures that most of the user terminals in the virtual cell coverage area will make cell (re) selection into the virtual cell.

In an embodiment, a second virtual cell can be started to masquerade the serving cell and indicating highest HCS priority level for the first virtual cell in order to make sure that the first formed virtual cell will be selected by most of the user terminals.

In an embodiment, the parameters related to cell reselection criteria broadcasted in system information are set so that the formed virtual cell is the most tempting target for cell reselection. Cell reselection criteria and parameters are described, for example, in the 3GPP specifications TS25.304.

In an embodiment, the cell (re) selection related parameters of Qhcs, TEMPORARY_OFFSET1, TEMPORARY_OFFSET2, Penalty_Time, Qoffset1, Qoffset2, Qqualmin and Qrxlevmin are set to a minimum value or near to a minimum value. In an embodiment, the parameters of Qhyst1 and Qhyst2 are set to a (near) maximum value. In order to have a good uplink quality, the Maximum allowed uplink transmission power is set to a (near) maximum value. This parameter is described in 3GPP TS 25.331. In the case there is a need for keeping a user terminal camped to the virtual cell, the parameters of Qhyst1 and Qhyst2 can be set to their (near) minimum value. This may be needed e.g. for radio direction finding.

Figure 3:
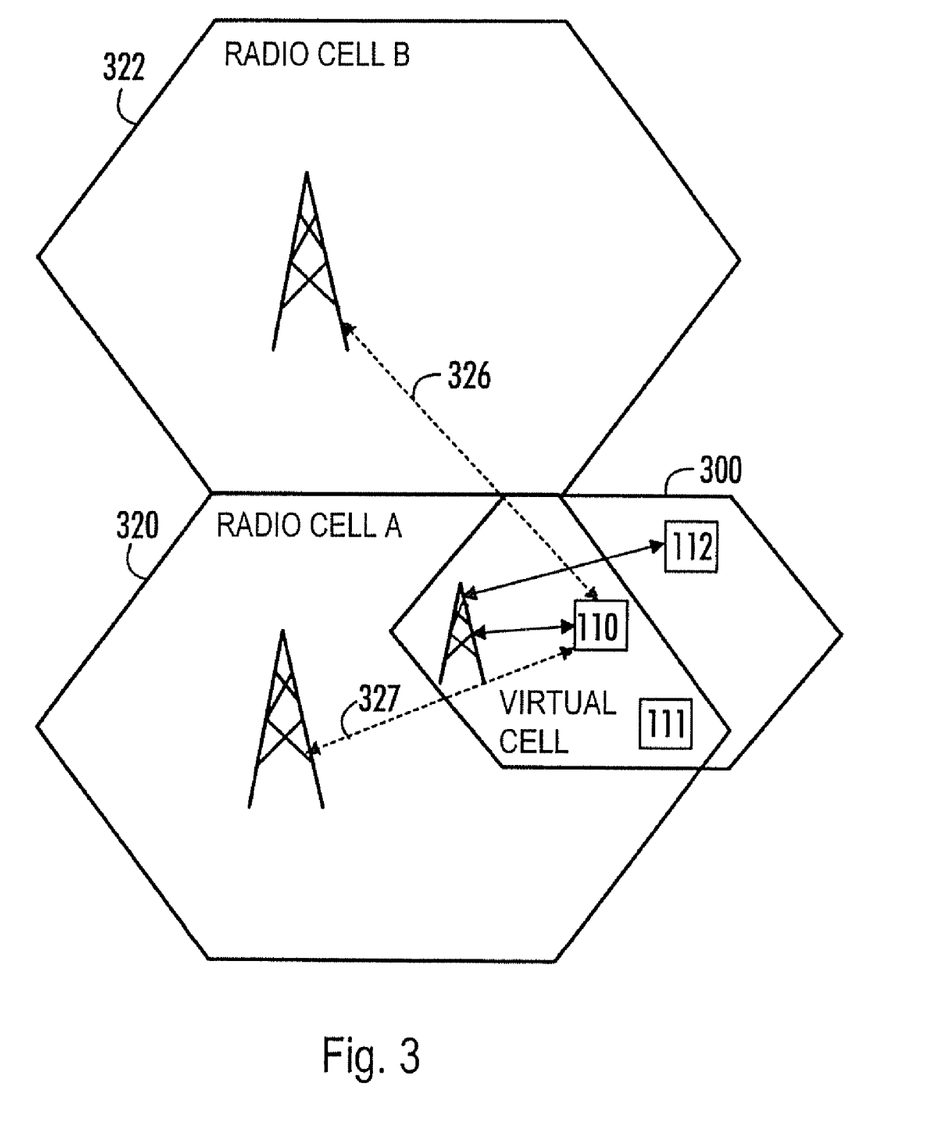
FIG. 3 illustrates an example of cell coverage areas of a public radio network and a virtual cell area formed by a measuring system.

FIG. 3 shows an example of the cellular coverage areas of a cellular radio network and a measuring system. The user terminals 110-112 to be measured may be within a WCDMA cellular coverage area, for example. In the example of FIG. 3, the user terminals 110-111 are located in a coverage are of a radio cell A 320 of the cellular radio network, the coverage area serving the user terminals 110-111 and being located in a first area. A coverage area of a radio cell B 322 is located in a second area. The user terminals 110-112 also measure signals 326, 327 transmitted by the base stations in neighboring cells, for example signals from neighboring radio cell B 322. The signals are measured for example for evaluating the need for cell reselection.

According to an embodiment, the base station 104 of the measuring system 100 is arranged to form at least one virtual cell area 300. In the example of FIG. 3, the measuring system 100 thus forms a new radio cell area 300 within the coverage area of radio cell A 320 of the radio network where there is a need to catch an identifier of a user terminal 110-112.

In an embodiment, the measuring device 108 is configured to measure parameters of a serving cell of the public land mobile network required for camping into the neighbor cells of the serving cell, and to camp into the neighbor cells in order to store reception quality and a neighbor cell list from the neighbor cells by using the measured parameters.

The base station 104 of the measuring system is configured to form a virtual radio cell, and to set parameters of the formed virtual cell for masquerading a neighbor cell such that the virtual cell becomes a tempting destination for a cell reselection.

The base station 104 is further configured to interfere the serving cell by at least one of: starting the transmission of the virtual cell; forming a second virtual cell masquerading the serving cell; transmitting noise in the transmission frequency; and jamming downlink frequencies of other base stations in order to cause the one or more user terminals 110-112 to camp into the virtual cell, and to catch one or more identifiers of the one or more user terminals 110-112 camping into the virtual cell after the start of virtual cell transmission.

According to an embodiment, a moving base station 104 receives identifiers of one or more user terminals 110-112 in each area of the formed virtual cell area 300 on the basis of location updates made by the mobile stations.

The mobile network code (MNC) and the mobile country code (MCC) used by the virtual cell area 300 can be the same as those of the radio network and its location area code (LAC) is different than the location area code of the neighbor cells.

User terminals within the virtual cell area 300 may perform location updates to the base station 104 by using a TMSI identifier (temporary mobile subscriber identity). The base station 104 asks the user terminal to send its identifier, such as the IMSI or IMEI. The base station 104 may close connection to the one or more user terminals 110-112 with a cause code after catching the one or more identifiers of the one or more user terminals for preventing the one or more user terminals from camping into the virtual cell 300 and for enabling the user terminals 110-112 to reselect another radio cell 320-322 from the public radio network. In an embodiment, when the identifier of the user terminal 110-112 is received, the base station 104 is arranged to maintain a radio connection or to set up a new radio connection to the user terminal 110-112 to be measured. The processing unit 102 is arranged to find a direction to the user terminal 110-112 on the basis of the radio connection. The radio connection to the user terminal 110-112 may be set up only for a little while at a time. The neighbor cell settings of the measuring system may be modified for example to allow a plural number of measuring devices to be used or to remove cells disturbing the measurement of the mobile network from the list of neighbor cells of the user terminal.

According to an embodiment, a directional antenna is used to find the direction of the best radio field. In an embodiment, the radio direction finding can be done in a following way. The base station having the virtual cell is equipped with a directional antenna. The base station is configured to perform power measurements on the user terminals DCH (dedicated channel) connection a few of times per second, for instance five times per second. A SIR (Signal to Interference Ratio) target may be set quite high for having a maximum impact of antenna direction to transmit power. When the directional antenna beam is directed towards the user terminal, the base station can keep the SIR target with lower power when compared with a situation where the antenna beam is not pointing to the user terminal. Following power measurements and antenna direction, the direction to the user terminal can be determined. The antenna may be for example a small, portable directional antenna, such as a slot antenna, whose direction a rescue team member, for example, may adjust manually on the basis of the power measurements.

According to an embodiment, the measuring system is portable, the base station thus being a small pico base station and the processing unit and the network element being arranged to operate in the portable device. In that case, a small directional antenna can be used, and the equipment is provided with batteries. The batteries may be replaceable during operation.

Since the measuring system 100 can be mobile, the direction to the user terminal may be determined by moving the measuring system 100 towards the user terminal 110. By moving the measuring system 100, it is also possible to triangulate, for example, the location of the user terminal 110. The direction finding is carried out using for example the values measured by the measuring system 100 in its different locations as the location of the measuring system changes towards the user terminal.

Figure 2:
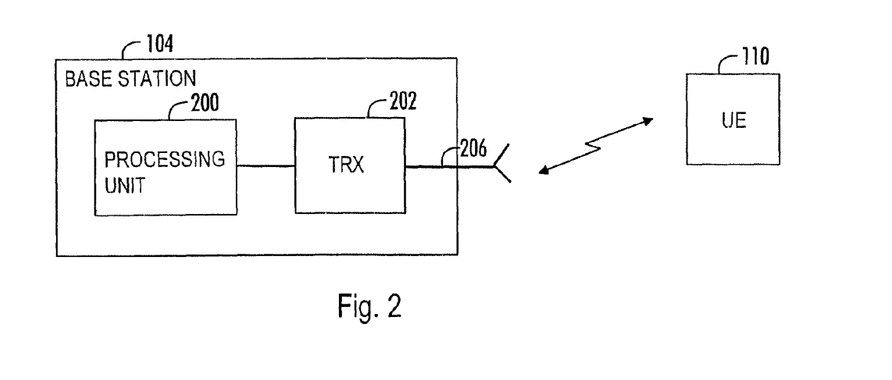
FIG. 2 illustrates an example of a base station of a measuring system, and a user terminal.

FIG. 2 shows a base station 104 of a measuring system and a user terminal 110. The base station 104 is a small portable pico base station comprising at least one processing unit 200 for controlling the operations of the base station, at least one transceiver 202 connected to the processing unit for communications purposes, and at least one antenna 206 connected to the transceiver 202 for transmitting and receiving radio waves.

According to an embodiment, the transceiver 202 of the base station is controlled by the processing unit 200 and arranged to form at least one virtual cell. The processing unit 200 of the base station 104 is also arranged to set parameters of the formed virtual cell for masquerading a neighbor cell such that the virtual cell becomes a tempting destination for cell reselection.

The base station 104 is further configured to interfere the serving cell by at least one of: starting the transmission of the virtual cell; forming a second virtual cell masquerading the serving cell; transmitting noise in the transmission frequency; and jamming downlink frequencies of other base stations in order to cause the one or more user terminals to camp into the virtual cell, and to catch one or more identifiers of the one or more user terminals camping into the virtual cell after the start of virtual cell transmission.

Using the identifier catching method described above, the user terminals in the coverage area of a virtual cell can be camped to the virtual cell, and a location update can be made to the virtual cell. In the case there is a need for finding a specific user terminal, the connection to the user terminal is not released after the location update but kept on, and the time the user terminal keeps the connections on is used for finding a radio direction to the user terminal.

According to an embodiment, a directional antenna of the base station can be used to measure transmit power on the radio channel of the user terminal at predetermined intervals; and the direction to the user terminal can be determined on the basis of the measured transmit powers and direction of the directional antenna.

In another embodiment, the virtual cell can be moved towards the user terminal after a connection to the user terminal is released; and the measuring of the transmit power and determining the direction to the user terminal can be repeated at the new location of the virtual cell. The user terminal location can be determined, for example, based on the measurement results from the repeated measurements at different locations. When an approximate direction and distance to a measured user terminal have been determined at a first location, the base station 104 (and the virtual cell coverage area) can be moved to a second location where the same measurements are repeated. The measured user terminal can be found, for example, at an intersection point of different direction vectors from these locations. The measurements can be further improved by moving the place of the second location closer to the measured user terminal on the basis of the results from the first measurements at the first location.

In certain cases, the measurement can be repeated four times before the user terminal sets the virtual cell to a black list and stops camping into it. After a fourth measurement, a LAC code of the virtual cell can be changed and the measurement can be repeated with a new LAC code. The black list size is thus four LACs. After a fifth trial, the first used LAC code can be used again. With using one LAC code, a user terminal can be searched for a time of 4 times 20 seconds. Utilizing the time before connection drop for measuring the best radio field direction can be used for direction finding.

In an embodiment, a direction sensitive receiver with a power indicator tuned to the uplink frequency the user terminal is using is used for radio direction finding. In this case, the user terminal is set to transmit with maximum power by controlling the allowed maximum power value and closed loop power control.

In another embodiment, beamforming in the base station antennas is used for detecting a direction/transmitting power level ratio, and for finding a user terminal on the basis of the detected direction/transmitted power level ratio.

Figure 4:
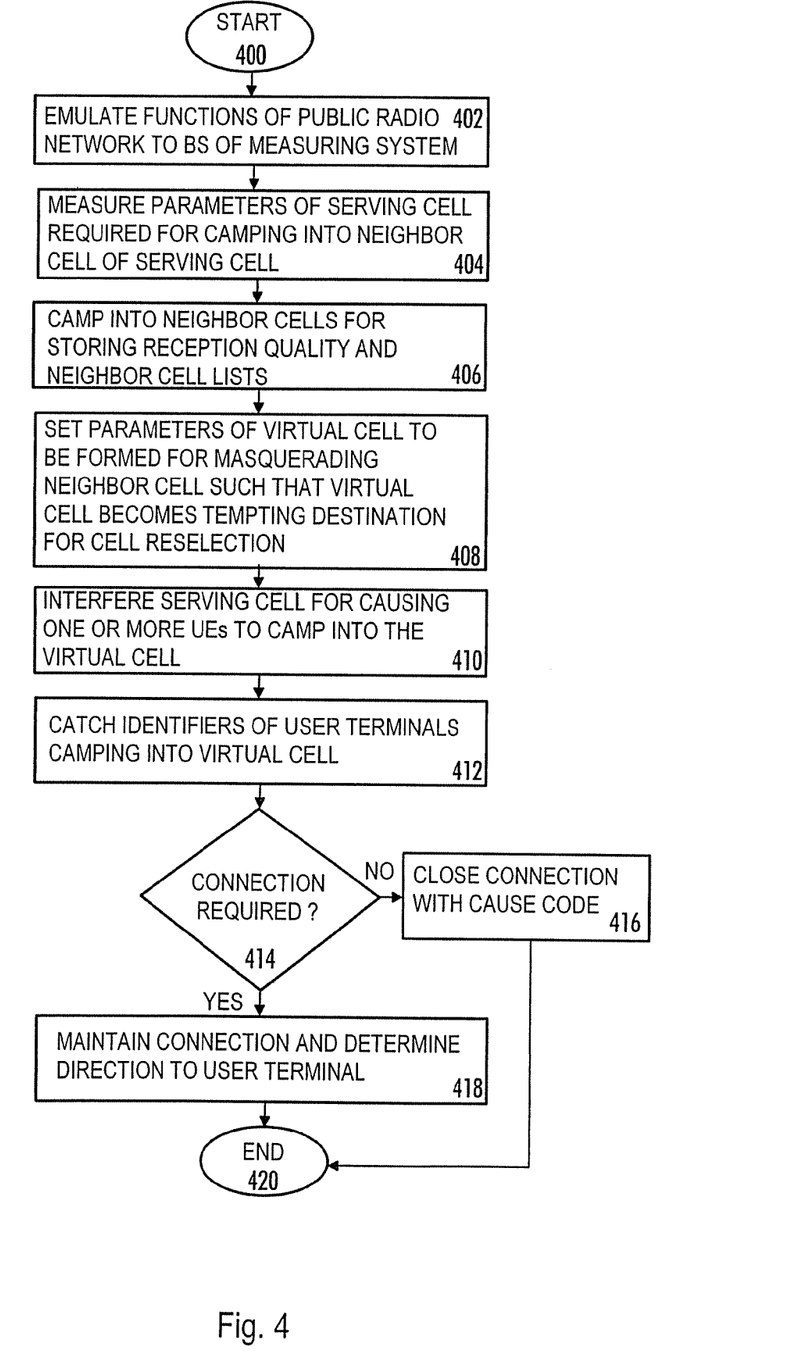
FIG. 4 illustrates an example of a method according to an embodiment.

FIG. 4 illustrates a method according to an embodiment of the invention. The method starts in 400. In 402, the functions of a public land mobile network are emulated to a base station of a measuring system by a network element of the measuring system. In 404, parameters of a serving cell of the public land mobile network required for camping into the neighbor cells of the serving cell are measured. In 406, the measured parameters are used for camping into the neighbor cells in order to store reception quality and neighbor cell lists from the neighbor cells. In 408, parameters of a virtual cell to be formed are set for masquerading a neighbor cell in the neighbor cell list such that the formed virtual cell becomes a tempting destination for a cell reselection.

In 410, the base station 104 is further configured to interfere the serving cell by at least one of: starting the transmission of the virtual cell; forming a second virtual cell masquerading the serving cell; transmitting noise in the transmission frequency and jamming downlink frequencies of other base stations in order to cause the one or more user terminals to camp into the virtual cell.

In 412, one or more identifiers of the one or more user terminals camping into the virtual cell after the start of virtual cell transmission are catched.

If, in 414, a connection to a user terminal camped into the virtual cell is not needed after catching the identifier of the user terminal, 416 is entered where the connection to the user terminal is closed with a cause code. In 418, the connection between the virtual cell and a user terminal is maintained after a location update by the user terminal for determining a radio direction to the user terminal. The method ends in 420.

The embodiments of the invention may be realized in an electronic device, comprising a controller. The controller may be configured to perform at least some of the steps described in connection with the flowchart of FIG. 4 and in connection with FIGS. 1 to 3. The embodiments may be implemented as a computer program comprising instructions for executing a computer process.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but it can be modified in several ways within the scope of the appended claims.

The invention claimed is:

1. A method comprising:
   emulating the functions of a public land mobile network to a base station of a measuring system by a network element of the measuring system;
   forming at least a first virtual cell via the measuring system;
   measuring parameters of a serving cell of the public land mobile network for camping into neighbor cells of the serving cell;
   camping into the neighbor cells in order to store reception quality and neighbor cell lists from the neighbor cells by using the measured parameters;
   setting parameters of the formed virtual cell such that the first virtual cell becomes a tempting destination for a cell reselection;
   interfering the serving cell in order to cause one or more user terminals to camp into the first virtual cell by forming a second virtual cell masquerading the serving cell; and
   catching one or more identifiers of the one or more user terminals camping into the first virtual cell after the start of virtual cell transmission.

2. The method of claim 1, further comprising: closing connection to the one or more user terminals with a cause code after catching the one or more identifiers of the one or more user terminals for preventing the one or more user terminals camping into the first virtual cell and for enabling the one or more user terminals to reselect another cell from the public land mobile network.

3. The method of claim 1, further comprising: measuring at least the parameters of frequency, scrambling codes, and neighbor cells of a serving cell of the public land mobile network for camping into the neighbor cells.

4. The method of claim 1, further comprising: measuring network access providers and network service providers for camping into the neighbor cells.

5. The method of claim 1, further comprising: setting a location area code of the first virtual cell to be different than that of the serving cell and that of the neighbor cells for causing the one or more user terminals to make location updates into the virtual cell.

6. The method of claim 1, further comprising: maintaining a connection between the first virtual cell and a user terminal for determining a radio direction to the user terminal.

7. The method of claim 6, further comprising: measuring, by a directional antenna of the base station, transmit power on the radio channel of the user terminal at predetermined intervals; and determining the direction to the user terminal on the basis of the measured transmit powers and direction of the directional antenna.

8. The method of claim 7, further comprising: moving the first virtual cell towards the user terminal after a connection to the user terminal is released; and repeating measuring of the transmit power and determining the direction to the user terminal.

9. A measuring system comprising:
   at least one processing unit controlling the operations of the measuring system;
   at least one base station configured to form at least a first virtual cell;
   a network element configured to emulate the functions of a public land mobile network to the base station; and
   a measuring device configured to measure parameters of a serving cell of the public land mobile network for camping into neighbor cells of the serving cell, to camp into the neighbor cells in order to store reception quality and neighbor cell lists from the neighbor cells by using the measured parameters;
   wherein the base station is further configured to set parameters of the formed virtual cell such that the first virtual cell becomes a tempting destination for a cell reselection, to interfere the serving cell in order to cause one or more user terminals to camp into the first virtual cell by forming a second virtual cell masquerading the serving cell, and to catch one or more identifiers of the one or more user terminals camping into the first virtual cell after the start of virtual cell transmission.

10. The measuring system according to claim 9, wherein the base station is configured to form at least one virtual cell, and the base station is further configured: to set parameters of the formed virtual cell such that the first virtual cell becomes a tempting destination for a cell reselection, to interfere the serving cell in order to cause the one or more user terminals to camp into the virtual cell, and to catch one or more identifiers of the one or more user terminals camping into the first virtual cell after the start of virtual cell transmission.

11. The measuring system according to claim 9, wherein the network element is configured to emulate the functions of a public land mobile network to a base station of the measuring system, and to control the base station to form at least one virtual cell, and the network element is further configured to control the base station to set parameters of the formed virtual cell such that the first virtual cell becomes a tempting destination for a cell reselection, to interfere the serving cell in order to cause the one or more user terminals to camp into the virtual cell, and to catch one or more identifiers of the one or more user terminals camping into the first virtual cell after the start of virtual cell transmission.

12. The measuring system according to claim 9, wherein the measuring device is configured to measure parameters of a serving cell of the public land mobile network required for camping into the neighbor cells of the serving cell, and to camp into the neighbor cells in order to store reception quality and neighbor cell lists from the neighbor cells by using the measured parameters in order to enable the base station of the measuring system to set parameters of a formed virtual cell such that the first virtual cell becomes a tempting destination for a cell reselection, to interfere the serving cell in order to cause the one or more user terminals to camp into the virtual cell, and to catch one or more identifiers of the one or more user terminals camping into the first virtual cell after the start of virtual cell transmission.

13. A non-transitory computer-readable program distribution medium encoding a computer program of instructions for executing a computer process comprising:

emulating the functions of a public land mobile network to a base station of a measuring system by a network element of the measuring system;

forming at least a first virtual cell by means of the measuring system;

measuring parameters of a serving cell of the public land mobile network required for camping into neighbor cells of the serving cell;

camping into the neighbor cells in order to store reception quality and neighbor cell lists from the neighbor cells by using the measured parameters;

setting parameters of the formed virtual cell such that the first virtual cell becomes a tempting destination for a cell reselection;

interfering the serving cell in order to cause one or more user terminals to camp into the first virtual cell by forming a second virtual cell masquerading the serving cell; and     catching one or more identifiers of the one or more user terminals camping into the first virtual cell after the start of virtual cell transmission.

14. The non-transitory computer-readable program distribution medium of claim 13, wherein the distribution medium includes at least one of the following media: a computer readable medium, a program storage medium, a record medium, and a computer readable memory.

15. The method of claim 1, wherein the interfering of the serving cell further comprises at least one of the following: the transmission of the virtual cell, and transmitting noise in a transmission frequency between the serving cell and the one or more user terminals.

16. The measuring system of claim 9, wherein the base station is further configured to interfere the serving cell further comprises at least one of the following: the transmission of the virtual cell, and transmitting noise in a transmission frequency between the serving cell and the one or more user terminals.

17. The non-transitory computer-readable program distribution medium of claim 13, wherein the interfering of the serving cell further comprises at least one of the following: the transmission of the virtual cell, and transmitting noise in a transmission frequency between the serving cell and the one or more user terminals.

\* \* \* \* \*